May 29, 1923.
H. D. ELFRETH
1,456,631
WEIGHING MACHINE
Filed Dec. 24, 1919
2 Sheets-Sheet 1
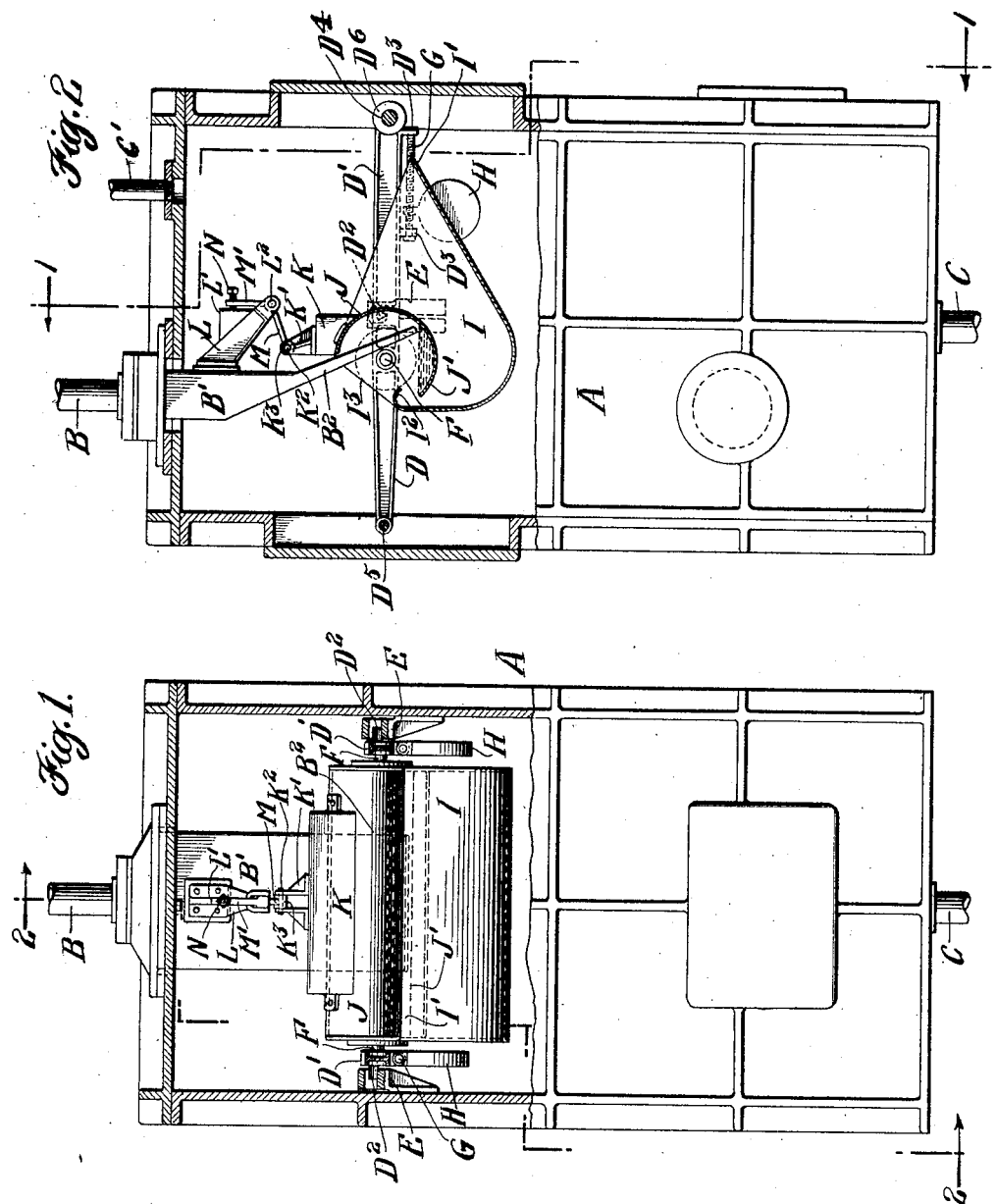

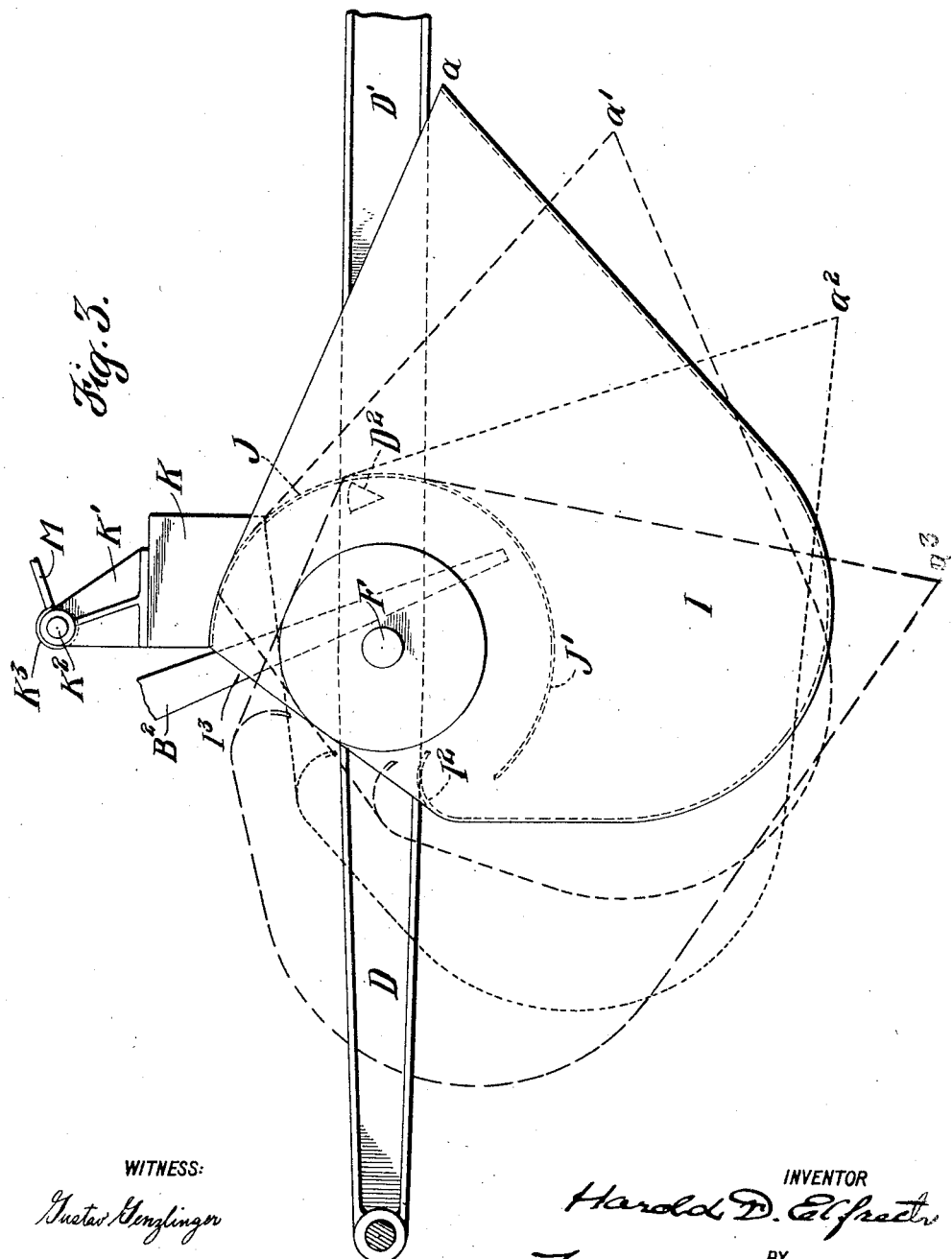

Patented May 29, 1923.

1,456,631

UNITED STATES PATENT OFFICE.

HAROLD D. ELFRETH, OF PHILADELPHIA, PENNSYLVANIA, ASSIGNOR, BY MESNE ASSIGNMENTS, TO H. S. B. W.-COCHRANE CORPORATION, OF PHILADELPHIA, PENNSYLVANIA, A CORPORATION OF PENNSYLVANIA.

WEIGHING MACHINE.

Application filed December 24, 1919. Serial No. 347,096.

*To all whom it may concern:*

Be it known that I, HAROLD D. ELFRETH, a citizen of the United States of America, residing in the city and county of Philadelphia, in the State of Pennsylvania, have invented certain new and useful Improvements in Weighing Machines, of which the following is a true and exact description, reference being had to the accompanying drawings, which form a part thereof.

My invention relates to weighing machines, and is especially, though not exclusively, intended for use in machines for weighing liquids. My invention has especial reference to that class of weighing machines in which the material to be weighed is delivered in a tilting bucket yieldingly supported on weighing mechanism and so organized that when a determined weight of material is delivered into the bucket it will tilt and deliver its contents. Apparatus of this kind is quite generally constructed with tilting buckets arranged in pairs and in connection with mechanism by which the material from the source of supply is deflected from one bucket to the other. Weighing mechanism has also been devised in which a tilting bucket is used in combination with an intercepting receptacle combined with but not directly attached to the bucket, and so actuated that it will intercept and hold the material to be weighed while the bucket is in dumping position, and deliver its contents to the bucket when it is returned to normal receiving position.

The object of my invention is to provide a construction in which an intercepting receptacle will be attached to and form a part of the bucket structure, and a leading feature of my invention consists of a tilting bucket having an intercepting receptacle built into and forming a part of the upper portion of the bucket, and so arranged that when the bucket is in receiving position the liquid, or other material, will flow freely from the receptacle into the bucket and when the bucket is in tilting position the receptacle will receive and retain a considerable quantity of the material to be weighed.

Another feature of my invention consists in so balancing the swinging bucket, so locating the latch which holds it in position to be filled, and so disposing parts which might serve as stops to arrest the motion of the bucket, that the bucket will swing from a latch engaged position to its extreme dumping position, and back to latch engaging position without having its motion arrested by a stop other than the latch, thus avoiding the severe and destructive effect of the bucket striking against a stop or stops.

The nature and detail of my invention will be best understood as described in connection with the drawings in which it is illustrated and in which Figure 1 is an elevation of a tank equipped with my improved weighing mechanism and taken on the line 1—1 of Figure 2.

Figure 2 is a view of the same mechanism taken on the line 2—2 of Figure 1, and

Figure 3 is a view similar to Fig. 2, but on a larger scale and showing in dotted lines various positions of the bucket.

A indicates the tank, B a pipe or conduit connecting with the spout B′, the lower portion B² of which extends, preferably, into the bucket, as shown. C is the outlet pipe from the tank and C′ a vent pipe. D, D′ are the arms of a pair of scale beams extending out on each side of knife edges D², supported, as shown, on brackets E, E. Two scale beams are, as shown, connected together at their ends by rods D⁴ and D⁵, D⁶ indicating a fixed weight secured on the rod D⁴, and the arms D′ of the scale beams being formed, as shown, with lugs D³, D³, forming supports and bearing for threaded rods G, on which adjustable weights H are supported.

I is a tilting bucket attached to shaft F, the ends of which have bearings in the arms D, D, of the scale beams. I′ indicates the front or delivery end of the bucket, and I² the rear end of the bucket which is preferably formed with an inwardly turned lip, as shown. J is an intercepting receptacle having, as shown, preferably, the form of a segment of a cylinder attached at its opposite ends to the walls of the bucket, and having, as shown, its lower edge J′ so arranged that when the bucket is in normal receiving position, as shown in the drawings, material flowing into the intercepting receptacle will for the most part flow freely out and over its edge J′ into the bucket. The form of the receptacle, as a whole, is such that when the bucket is in dumping position the receptacle will receive and retain a considerable quantity of the liquid or other material flowing into it. It will be understood that the inwardly turned lip on the edge $I^2$ of the bucket is provided to prevent the material from flowing over the back of the bucket as it passes from the receptacle J into the bucket.

K is a boxlike structure secured to the upper end of the receptacle J and serving as a counterweight to balance the bucket and as a support for a bracket K′, which supports between bifurcated arms a rod $K^2$ serving as a bearing for a roller $K^3$. L is a bracket secured, as shown, to the spout B′, and supporting on bifurcated arms a pivot pin $L^2$, the bracket being formed with an abutment indicated at L′. M, M′ is a bent lever pivoted on the bracket L, as shown, the arm M′ being provided with an adjusting abutment screw N, the function of which is to hold the arm M in position to abut squarely against the roller $K^3$ when the parts are in the position shown in Fig. 2.

In operation, and when the bucket I is empty, the parts will occupy the position shown in Fig. 2 and in full lines at $a$ in Fig. 3, the center of gravity of the empty bucket being, preferably, slightly on the right hand side of the pivot F. When the liquid or material to be weighed flows in through the spout B′, $B^2$, which extends through a space $I^3$ lying between the upper end of the receptacle J and the rear end $I^2$ of the bucket and is of sufficient breadth to permit of the desired tilting movement of the bucket, the material flowing into the receptacle J passes freely over its rear edge J′ into the bucket, and, as the material accumulates in the bucket the center of gravity is shifted further to the right hand side of the pivot F, but the bucket is still held in receiving position by the abutment of the roller $K^3$ against the lever arm M. When material of the desired weight has been delivered into the bucket the arms D of the scale beams move downward carrying the bucket with them and moving the attached roller $K^3$ downward so that it is disengaged from the lever arm M, whereupon the bucket turns on its pivotal support and dumps its contents into the tank, and, while the bucket is in this dumping position the receptacle J is shifted to a position in which it will retain the liquid, or other material, flowing into it through the spout.

When the contents of the bucket has been dumped the arms D, D, of the scale beams rise carrying, of course, the bucket with them and the bucket turns back by gravity to receiving position, the roller $K^3$ pushing the lever arm M upward as it passes under it and latching against it as soon as it has cleared the end of the lever. During this backward motion of the bucket the contents of the receptacle J is poured into the bucket.

It will be obvious, of course, that my construction enables an uninterrupted flow of the material to be weighed to be maintained.

As shown, and preferably, the shape of the receptacle J is such that a small portion of the liquid to be weighed is retained in the bottom of the receptacle. This is difficult to avoid if the receptacle is to be given its maximum retaining capacity, but need not be materially objectionable as the weight of this retained material can be properly allowed for in the adjustment of the weights on the scale beams.

Preferably, the bucket is so counterweighted and proportioned that its swinging movements will take place through an arc which will not bring it into arresting contact with any stop other than the latch which holds it in filling position, and this necessitates that its arc of movement shall not bring it in contact with the spout $B^2$ where the bucket and spout are constructed and arranged as illustrated. With this purpose in view I so balance the bucket that when empty and unlatched it will occupy the position indicated in Fig. 3 at $a'$, and when permitted to turn gravitally from position $a$ it will, when empty, swing to position $a^2$, and then back, coming to rest in position $a'$. The form and balance of the bucket is such that when filled it will, when unlatched from position $a$, swing to position $a^3$, and having dumped its contents, swing back to or slightly beyond position $a$, so as to reengage it with the latch. By so balancing the bucket all noise and jar arising from the bucket striking against stops is eliminated.

Having now described my invention, what I claim as new and desire to secure by Letters Patent, is:

1. A tilting bucket for weighing machines having an intercepting receptacle secured to it, and so arranged that when the bucket is in normal receiving position the material to be weighed will flow freely from the receptacle into the bucket, and when the bucket tilts to deliver its contents said receptacle will be turned to a position in which it will retain a considerable quantity of said material.

2. A tilting bucket for weighing machines having an intercepting receptacle secured to it, and so arranged that when the bucket is in normal receiving position the material to be weighed will flow freely from the receptacle into the bucket, and when the bucket tilts to deliver its contents said receptacle will be turned to a position in which it will retain a considerable quantity of said material, said bucket having a retaining lip at its rear or non-delivery end.

3. In a weighing machine a pivotally supported tilting bucket in combination with an intercepting receptacle secured to its upper part and moving with the bucket, said receptacle being so formed that when the bucket is in receiving position the material to be weighed will flow freely from the receptacle into the bucket and that when the bucket is tilted it will retain a considerable quantity of such material, and a delivery spout arranged to deliver material to said intercepting receptacle in all positions of the bucket.

4. In a weighing machine a pivotally supported tilting bucket in combination with an intercepting receptacle secured to its upper part and moving with the bucket, said receptacle being so formed that when the bucket is in receiving position the material to be weighed will flow freely from the receptacle into the bucket and that when the bucket is tilted it will retain a considerable quantity of such material, and said receptacle being so placed in the bucket as to have a space between its upper end and the rear edge of the bucket, and a delivery spout passing through said space arranged to deliver material to said intercepting receptacle in all positions of the bucket.

5. In a weighing machine a pivotally supported tilting bucket having an inwardly turned lip at its rear upper edge, in combination with an intercepting receptacle secured to its upper part and moving with the bucket, said receptacle being so formed that when the bucket is in receiving position the material to be weighed will flow freely from the receptacle into the bucket, and that when the bucket is tilted it will retain a considerable quantity of such material, and a delivery spout extending into the intercepting receptacle between its upper edge and the lip on the rear edge of the bucket.

6. A weighing machine having in combination a tilting bucket formed and counterweighted as described so as to come to a normal position of rest when unloaded intermediate its latch engaging and its load discharging position and so as to swing from latch engaging to load discharging and back to latch engaging position, said machine having no stop in the path of the bucket other than the latch, a latch for holding the bucket in filling position, and weight actuated mechanism for disengaging the bucket from the latch.

7. A weighing machine having a tilting bucket formed and counterbalanced so as to swing from a latch engaging to a load discharging position, and back to latch engaging position, without coming into arresting contact with a stop other than the latch, a latch for holding the bucket in filling position, weight actuated mechanism for disengaging the bucket from the latch, and a filling spout entering the top of the bucket and so disposed as not to contact with it.

HAROLD D. ELFRETH.